United States Patent
Paddock

(10) Patent No.: US 6,655,406 B1
(45) Date of Patent: Dec. 2, 2003

(54) HOT TAPPING APPARATUS AND METHOD

(76) Inventor: David A. Paddock, 18 Profile Circle, Nashua, NH (US) 03064

( * ) Notice: Subject to any disclaimer, the term of this patent is extended or adjusted under 35 U.S.C. 154(b) by 0 days.

(21) Appl. No.: 10/313,054

(22) Filed: Dec. 6, 2002

(51) Int. Cl.[7] .......................... F16K 43/00; F16L 41/06
(52) U.S. Cl. ...................... 137/318; 30/92.5; 89/1.14; 102/204; 102/470; 137/15.14
(58) Field of Search .......................... 89/1.14; 137/318, 137/15.14; 102/204, 470; 30/92.5

(56) References Cited

U.S. PATENT DOCUMENTS

| | | | |
|---|---|---|---|
| 1,907,188 A | * 5/1933 | Ransdell et al. | 137/318 |
| 3,983,897 A | * 10/1976 | Gebelius | 137/318 |
| 4,034,777 A | * 7/1977 | Gebelius | 137/318 |
| 4,050,720 A | 9/1977 | Reneau | 285/18 |
| 4,205,697 A | * 6/1980 | Gebelius | 137/318 |
| 4,261,384 A | * 4/1981 | Dahlbring | 137/318 |
| 4,331,170 A | 5/1982 | Wendell | 137/15.12 |
| 4,457,204 A | * 7/1984 | Blomgren | 137/318 |
| 4,541,447 A | 9/1985 | Soumar et al. | 137/15.14 |
| 5,065,780 A | * 11/1991 | Baubach | 137/318 |
| 5,257,644 A | 11/1993 | Saha et al. | 137/318 |
| 5,269,340 A | 12/1993 | Drzewiecki | 137/318 |
| 5,660,202 A | 8/1997 | Rush, Jr. et al. | 137/318 |
| 5,842,496 A | 12/1998 | Delanty et al. | 137/15.14 |
| 6,126,369 A | 10/2000 | Jiles | 408/101 |
| 6,200,068 B1 | 3/2001 | Bath et al. | 405/184.1 |
| 6,241,383 B1 | 6/2001 | Feller et al. | 371/40 |
| 6,290,431 B1 | 9/2001 | Exley et al. | 405/158 |

OTHER PUBLICATIONS

PSE, Inc., Series 110 Flow Sensors Instructions; pp 1–3, Belleville, MI.
SeaMetrics, Flow Meter Tech Bulletin: Removing and Replacing Hot–tap Flow Meter; Feb. 6, 2002; web pages; www.seametrics.com.
Intra–Automation America, LLC; Products Page—Flow Meters; Feb. 6, 2002; web pages; www.intra–automation.com.
KITZ Corporation of America; T–Plus Installation Guide; 1983.
PSE Inc.; What Is The PSE Par 7* Flow Sensor And Why Is It The Most Accurate Multi–Port Averaging Flow Sensor Available Today?; Belleville, MI.

* cited by examiner

Primary Examiner—George L. Walton
(74) Attorney, Agent, or Firm—Bourque & Associates, P.A.

(57) ABSTRACT

An apparatus and a method of hot tapping a conduit and inserting a sensor is disclosed wherein the conduit is hot tapped and the sensor inserted in one step. The apparatus includes a first cavity, a propellant disposed in a first end of the first cavity, a plunger, and a second cavity adapted to contain a sensor. The plunger includes a shearing surface and an aperture. The propellant propels the plunger from the first end of the first cavity towards the second end of the first cavity, creating an aperture in the conduit. When the plunger is disposed at the second end of the first cavity, the first and second cavity are in fluid communication with each other and the apertures in the plunger and the conduit are aligned with the second cavity, and the sensor is then automatically propelled through into the conduit by the propellant.

44 Claims, 6 Drawing Sheets

HOT TAPPING APPARATUS AND METHOD

TECHNICAL FIELD

The present invention relates to tapping into conduits and more particularly, relates to hot tapping conduits.

BACKGROUND INFORMATION

For a variety of reasons, it is sometimes necessary to gain direct access to the contents of a pressurized or other fluid-conducting conduit. Two general methods exist to achieve this result. The first method is referred to as "cold tapping". To "cold tap" a conduit, the conduit is de-pressurized and the contents usually removed. Cold tapping is usually considered the safest method of gaining direct access to the contents of a pressurized conduit since the contents are generally removed, thus, minimizing the likelihood of the contents coming in contact with a person.

Cold tapping does, however, have several drawbacks. For example, welders must often be called in to weld a tap onto the conduit or the conduit often cannot be de-pressurized for a variety or reasons such as the contents are needed for another processes or for environmental concerns. Furthermore, cold tapping a conduit is a time consuming process since the entire line, and not just a particular section thereof, may need to be drained and then treated. This can affect other processes, thus creating even more of a disturbance.

The second method of gaining direct access to the contents of a pressurized conduit is referred to as "hot tapping". Hot tapping is a term used to describe the situation where the access to the conduit is gained whilst the conduit is still under pressure or flow. A typical hot tap installation requires attaching a threaded coupling to the conduit at the desired location, usually through welding. Welding the coupling to the conduit often weakens the conduit and/or damages the contents of the conduit due to the extreme heat generated during the welding process.

Next, a temporary jig is attached to the conduit to drill through the coupling and then insert the tap (sensor, sampling probe, or other device). This is a lengthy process, requiring careful alignment, safety chains, and special tools and typically requires at least two people. Moreover, considerable space around the conduit is needed in order to allow the equipment and installers to have access to the conduit. The amount of space required could become a problem in areas with limited space such as ceilings and walls, or where other equipment is present. Furthermore, the drilling creates cuttings or "chips" which can enter and contaminate the conduit or damage other devices located downstream.

Accordingly, what is needed is an apparatus or method of hot-tapping a conduit that minimizes or eliminates the hazards and difficulties typically associated with hot-tapping. The apparatus or method should reduce material and labor costs, as well as increase worker safety. The apparatus or method should also not require special tools such as drilling rigs, and work in areas with limited space considerations. Furthermore, the apparatus or method should minimize or eliminate the possibility of blowback of the contents that are under pressure.

SUMMARY

The present invention features an apparatus for hot tapping a conduit. The apparatus includes a first cavity, a second cavity adapted to contain a sensor, a user activatable propellant adapted to be disposed in the first end of the first cavity, a plunger, and at least one passageway fluidly connecting the first and the second cavity when the plunger is disposed in the second position such that the propellant forces the sensor through the channel and into the conduit.

The plunger is disposed in the first cavity and includes a first end, a second end having a shearing surface, and an aperture disposed between the first and the second ends. In a first position, the plunger is disposed proximate the first end of the first cavity. When activated, the user activatable propellant forces the plunger from the first position to a second position proximate the second end of the first cavity such that the shearing surface of the plunger shears off a portion of the conduit creating an aperture in the conduit and retains the sheared portion of the conduit proximate the second end of the first cavity. In the second position, the aperture in the plunger is aligned with the second cavity and the aperture in the conduit to form a channel.

In one embodiment, the first passageway is proximate the first end of the plunger and the second passageway is disposed in the second cavity. When the apparatus is in first position, the first and the second passageways are not aligned. As a result, when the user activates the propellant, the plunger is propelled from the first position to the second position. When the apparatus is in the second position, the first and the second passageways become aligned and form a continuous passageway that fluidly connects the first and the second cavities. The propellant then flows through the first and the second passageways into the second cavity where the propellant forces the sensor through the channel. and into the contents of the conduit.

In another embodiment, the first passageway is disposed within the first cavity and the second passageway is disposed within the second cavity. When the apparatus is in the first position, the plunger blocks the first passageway so that the propellant cannot enter. Thus, when the user activates the propellant, the plunger is forced from the first position to the second position. When the plunger is in the second position, the first passageway is unsealed and the first cavity is in fluid communication with the second cavity. The propellant then flows into the second cavity and forces the sensor through the channel and into the contents of the conduit.

Optionally, the apparatus may include three or more cavities wherein the additional cavities are substantially the same as the second cavity. The plunger may also include a seal, such as an o-ring seal, between the plunger and the first cavity. A locking device and an anti-rotation device, such as a locking ring and groove and a channel respectively, is preferably provided that fixes the location of the sensor and/or the plunger within the conduit and/or first cavity.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
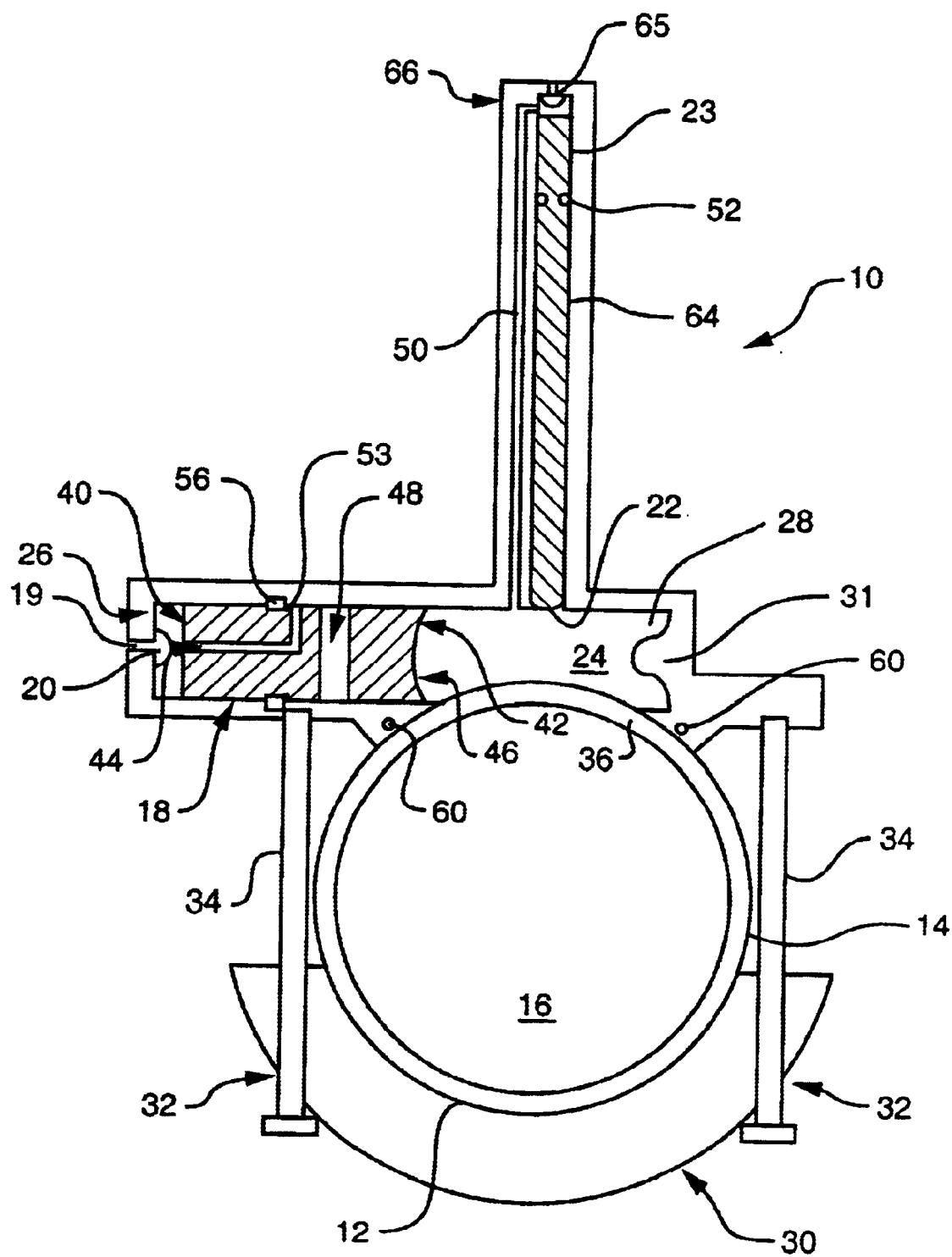
FIG. 1 is cross-sectional view according to one embodiment of the present invention in a first position.

A hot tap apparatus 10, FIGS. 1–5, in accordance with the present invention, allows a user to gain access into a conduit 12 having a sealed outer surface 14 without having to remove or drain the material 16 contained within the conduit 12 also known as "hot tapping". The hot tap apparatus 10 includes a first cavity 24 containing a plunger 18, a propellant 20, a second cavity 23 containing a sensor 22, and at least one passageway 44, 49, 50 fluidly connecting the first 24 and the second 23 cavities. In practice, the hot tap apparatus 10 is mounted to conduit 12 using any means 30 known to those skilled in the art such as welding or clamping, but preferably using a clamping device 32 using bolts 34.

Figure 3:
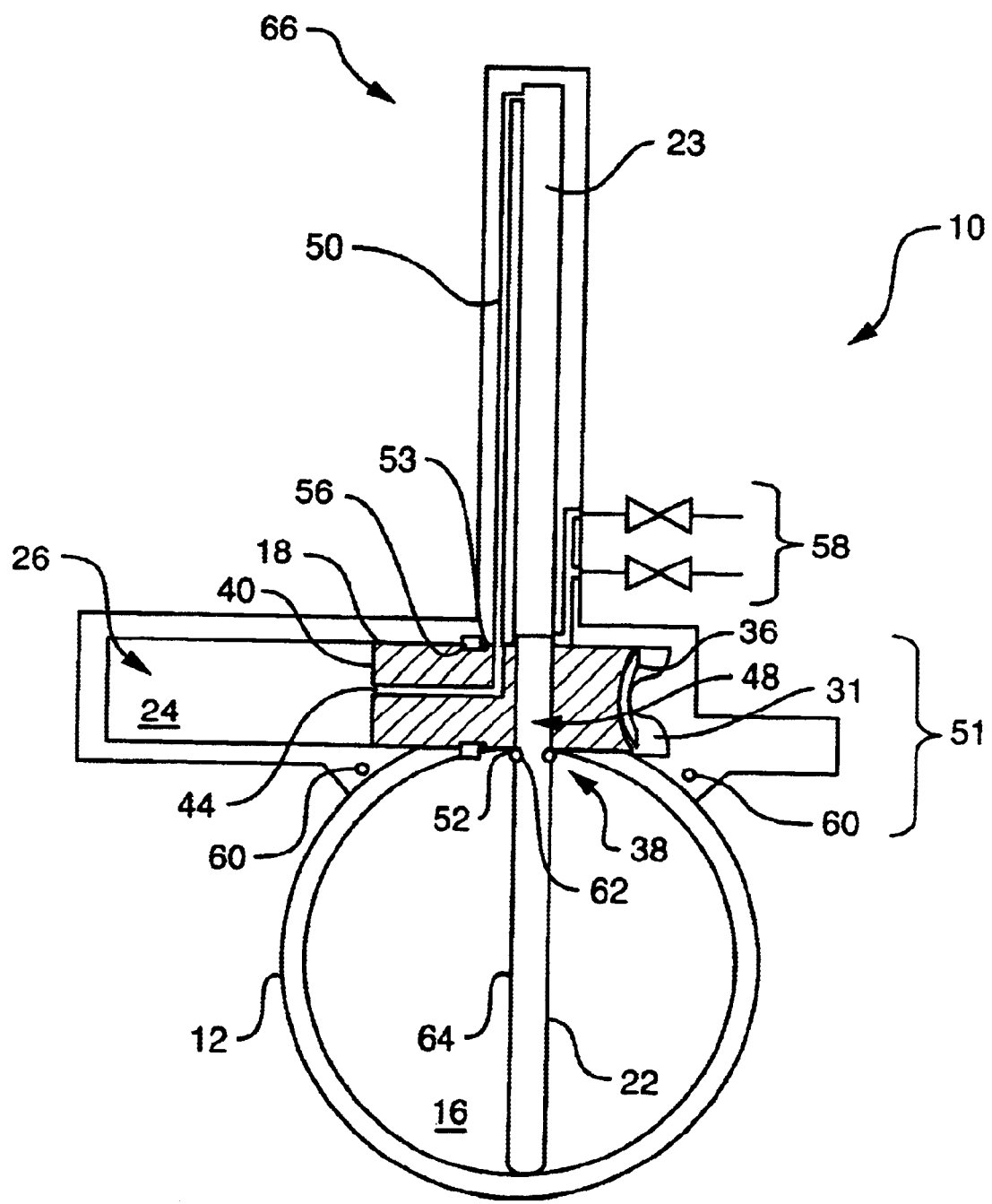
FIG. 3 is cross-sectional view according to one embodiment of the present invention in a second position.
Figure 4:
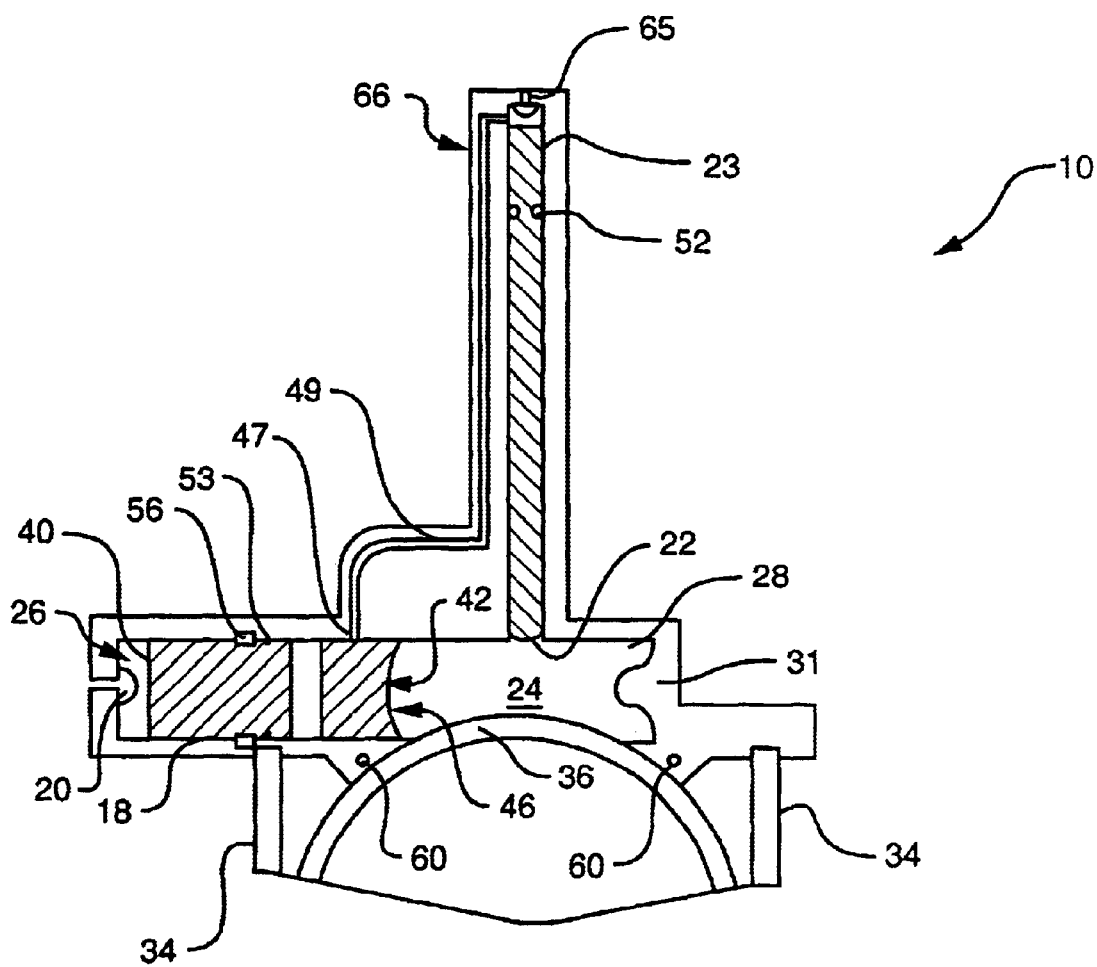
FIG. 4 is cross-sectional view according to another embodiment of the present invention in a first position.
Figure 5:
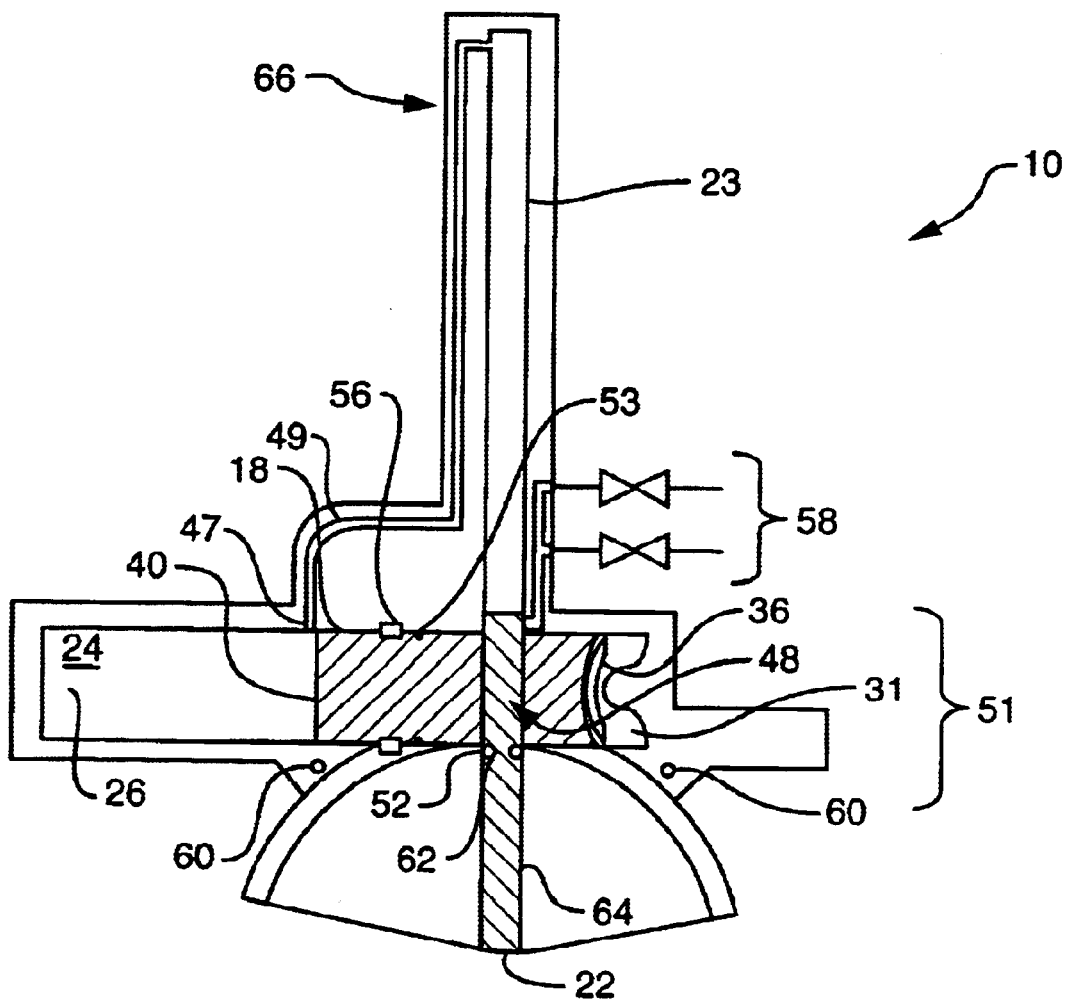
FIG. 5 is cross-sectional view according to another embodiment of the present invention in a second position.

The first cavity 24 includes a first 26 and a second 31 end. The propellant 20 is introduced in the first end 26 of the first cavity 24, from either an internal or external source, and forces the plunger 18 from a first position P1 (as shown in FIGS. 1 and 4) wherein the plunger 18 is proximate the first end 26 of the first cavity 24, to a second position P2 (as shown in FIGS. 3 and 5) wherein the plunger 18 is proximate the second end 31 of the first cavity 24. The propellant 20 may include any known propellant such as, but not limited to, compressed gas, liquid propellants, or solid propellants such as gunpowder type charges. In the preferred embodiment, the propellant 20 is an explosive charge producing a gas that is ignited using an external device such as a hammer that is struck against the end region 19, or any other device known to those skilled in the art. The plunger 18 preferably includes at least one sealing member 56 such as, but not limited to, an o-ring seal to prevent the propellant 20 from blowing-by the plunger 18. The o-ring seal may include any shape, other than circular, to account for the shape of the plunger 18.

The second end 31 of the first cavity 24 includes a retaining section 28 that retains a sheared-off section 36, FIGS. 3 and 5, of the conduit 12 (as will be discussed in greater detail below). As a result, foreign material, such as pipe shavings, cuttings, chips, or the like, is prevented from entering the conduit 12 and contaminating the contents 16.

Figure 2:
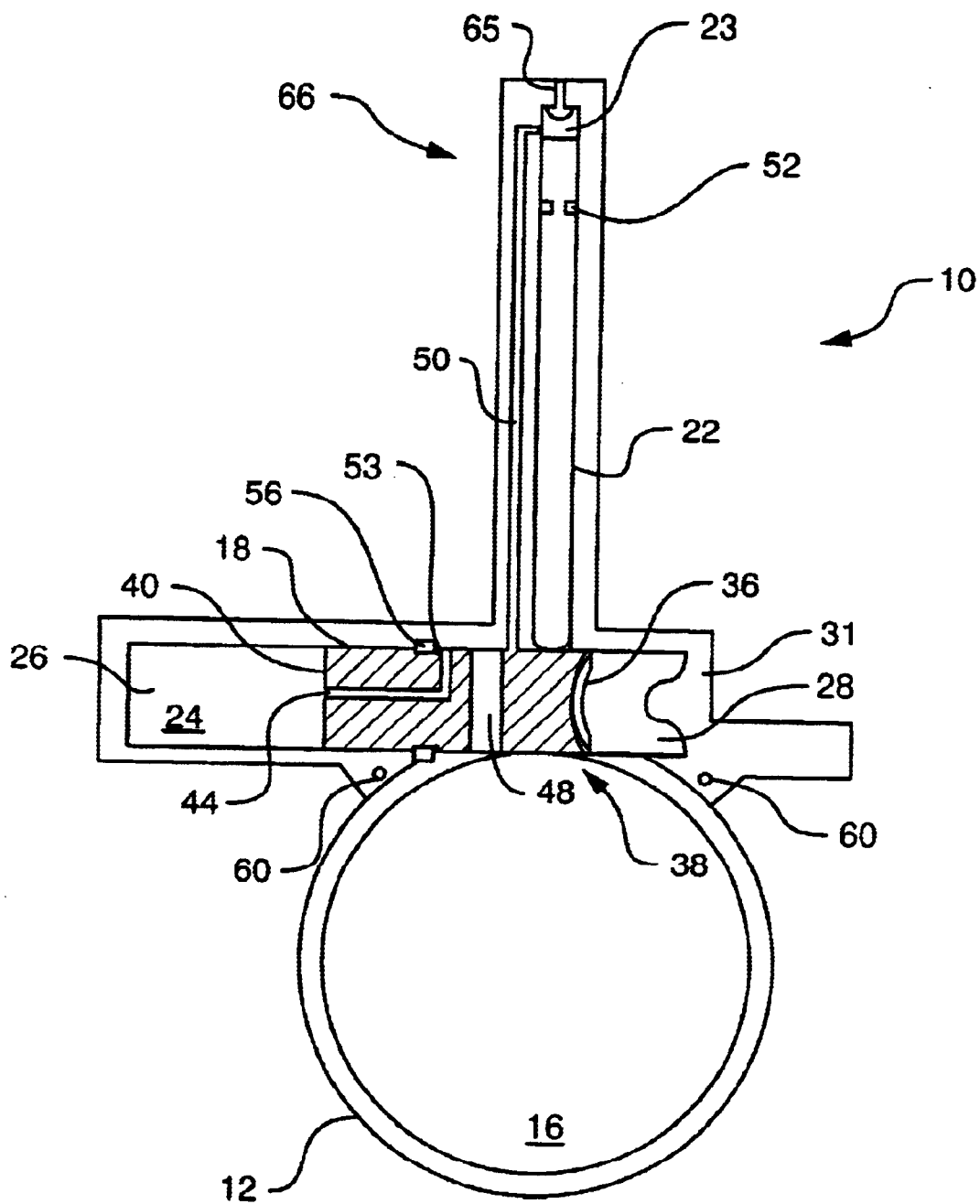
FIG. 2 is cross-sectional view according to one embodiment of the present invention in an intermediary position.

The plunger 18 includes a cutting or shearing surface 46 disposed on a second end 42 that removes a section 36, FIG. 2, of the conduit 12 forming an aperture 38 as it is propelled from the first position P1 to the second position P2. The plunger 18 may have any shape, but preferably has a shape that prevents the plunger 18 from rotating within the first cavity 24. For example, the plunger 18 and the first cavity 24 may form a "groove and channel" or "rib and groove". Other shapes that prevent rotation of the plunger 18 within the first cavity 24 such as, but not limited to, ovals, triangles, rectangles, and the like, are also envisioned.

The plunger 18 also includes an aperture 48. The aperture 48 is disposed between the first 40 and the second end 42 of the plunger 18 such that in the disclosed embodiment, when the plunger 18 is in the second position P2, the aperture 48, the second cavity 23, and the aperture 38 in the conduit 12 are aligned with the second cavity 23 and form a channel 51. Once the channel 51 is formed, the propellant 20 flows through the passageway 44, 49, 50 and forces the sensor 22 through the channel 51, and into the conduit 12, as will be described in greater detail below.

In one embodiment, the hot tap apparatus 10, FIGS. 1–3, includes a first passageway 44 disposed proximate the first end 40 of the plunger 18 and a second passageway 50 disposed within the second cavity 23. When the apparatus 10 is in first position P1, FIG. 1, the first 44 and the second 50 passageways are not aligned. As a result, when the user activates the propellant 20, the plunger 18 is propelled from the first position P1 to the second position P2, FIG. 3. When the apparatus 10 is in the second position P2, the first 44 and the second 50 passageways become aligned and form a continuous passageway that fluidly connects the first 24 and the second 23 cavities. The propellant 20 then flows through the first 44 and the second 50 passageways into the second cavities 23 where the propellant 20 forces the sensor 22 through the channel 51 and into the contents 16 of the conduit 12.

In another embodiment, the hot tap apparatus 10, FIGS. 4–5, includes a passageway 49 that fluidly connects the first cavity 24 and the second cavity 23 such that when the apparatus 10 is in the first position P1, FIG. 4, the plunger 18 blocks an opening 47 in the passageway 49. Thus, when the user activates the propellant 20, the propellant 20 cannot enter the passageway 49 and the plunger 18 is forced from the first position P1 to the second position P2, FIG. 5. When the plunger 18 is in the second position P2, the passageway 49 is unsealed and the first cavity 24 is in fluid communication with the second cavity 23. The propellant 20 then flows into the second cavity 23 and forces the sensor 22 through the channel 51 and into the contents 16 of the conduit 12.

The hot tap apparatus 10, FIGS. 1–2 and 4, may optionally include a second propellant 65 disposed proximate a first end 66 of the second cavity 23. The second propellant 65 may be any type of the propellant 20 as described hereinabove and is preferably activated by the first propellant 20. Alternatively, the second propellant 65 may also include a back-up or failsafe means of manually activating the second propellant 65 in any method described hereinabove for activating the first propellant 20. The use of the second propellant 65 may be useful in cold environments or whenever the first propellant 20 fails to fully or adequately propel the sensor 22 into the conduit 12.

Figure 6:
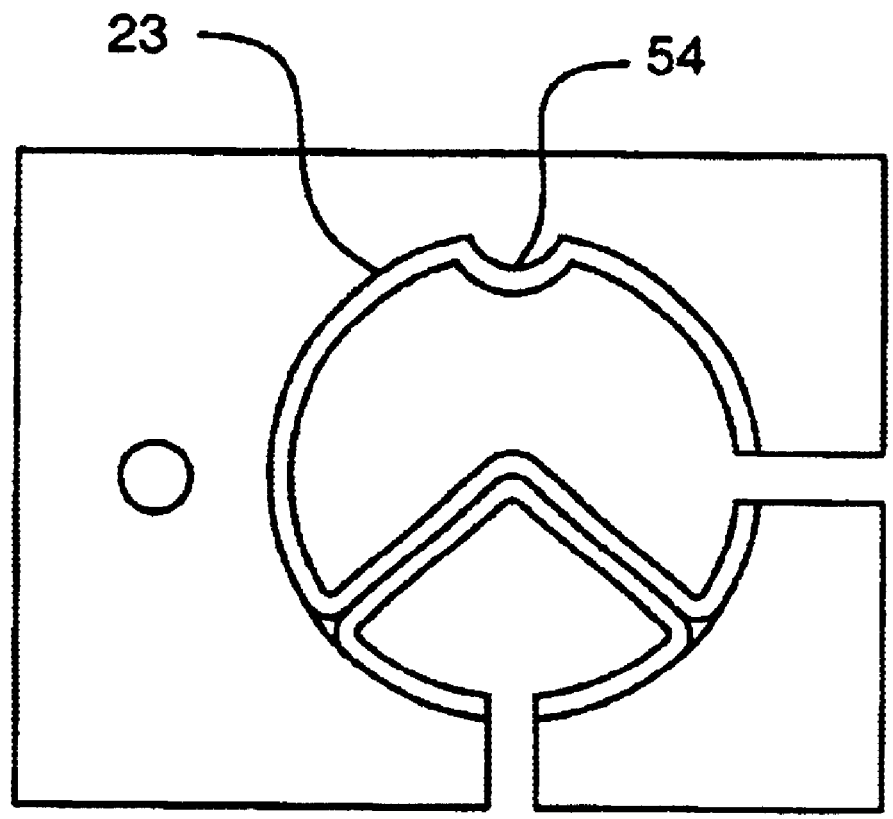
FIG. 6 is an elevated cross-sectional view of one embodiment of the second cavity according to the present invention.

In the preferred embodiment, the apparatus 10 includes an expandable locking apparatus 53, FIGS. 3 and 6, such as an expandable ring, that fixes the position of the plunger 18 within the first cavity 24. The locking apparatus 53 also aids in the formation of the channel 51 by aligning the aperture 48 in the plunger 18, the second cavity 23, and the aperture 38 in the conduit 12. While the locking apparatus 53 may include any number of different configurations, it is preferably a the locking ring 53 disposed in a groove (not shown) in the plunger 18 which expands once the plunger 18 is in the second position P2.

The apparatus 10 also preferably includes an expandable locking device 52, FIGS. 3 and 6, such as an expandable ring that fixes the position of the sensor 22 within the conduit 12 and prevents the sensor 22 from sliding back into the second cavity 23. While the locking device 52 may include any number of different configurations, the locking device 52 is preferably a locking ring that is disposed in a groove 62 in the sensor body 64 which expands once the locking ring 52 is outside the second cavity 23, and rests along the interior wall of the conduit, as shown in FIGS. 3 and 6. Additionally, the sensor 22 and/or second cavity 23 may include an anti-rotation groove or channel 54, FIG. 6, which prevents the sensor 22 from rotating and ensures the proper alignment of the sensor probe 22 within the conduit 12. Furthermore, sampling connections 58, FIGS. 3 and 5, may be provided on the hot tapping apparatus 10.

Additional cavities (not shown) may be included to contain additional sensors or the like to be inserted within the conduit 12. The additional cavities preferably operate in substantially the same manner as described above such that the additional sensors or the like are automatically inserted within the conduit 12 using the propellant 20. The hot tapping apparatus 10 may further include a seal 60 to prevent leakage around the aperture 38 in the conduit 12.

Accordingly, the hot tapping apparatus 10 of the present invention allows a user to tap into a pressurized conduit 12 without having to de-pressurize and remove the contents 16 of the conduit 12. Moreover, the hot tapping apparatus 10 minimizes or eliminates the hazards and difficulties typically associated with hot-tapping a conduit 12 and reduces material and labor costs. No special tools such as drilling rigs are required, and the hot tapping apparatus 10 works in areas with limited space considerations. Furthermore, the hot tapping apparatus 10 minimizes or eliminates the possibility of blowback of the contents 16 contained in the conduit 12.

Modifications and substitutions by one of ordinary skill in the art are considered to be within the scope of the present invention, which is not to be limited except by the following claims.

The invention claimed is:

1. An apparatus for hot tapping a conduit comprising:
   a first cavity having a first end and a second end;
   at least a second cavity adapted to contain a sensor;
   a user activatable propellant adapted to be disposed in said first end of said first cavity;
   a plunger disposed in said first cavity, said plunger having a first end, a second end having a shearing surface, and an aperture disposed between said first and said second end, whereby in a first position, said plunger is disposed proximate said first end of said first cavity, and whereby when activated, said user activatable propellant forces said plunger from said first position to a second position proximate said second end of said first cavity such that said shearing surface of said plunger shears off a portion of said conduit creating an aperture in said conduit and retains said portion of said conduit proximate said second end of said first cavity, and whereby in said second position said aperture in said plunger is aligned with said second cavity and said aperture in said conduit to form a channel; and
   at least one passageway fluidly connecting said first and said second cavity when said plunger is disposed in said second position such that said propellant forces said sensor through said channel and into said conduit.

2. The apparatus as claimed in claim 1 wherein said plunger further includes a seal between said plunger and said first cavity.

3. The apparatus as claimed in claim 2 wherein said seal includes an o-ring seal.

4. The apparatus as claimed in claim 1 wherein said apparatus further includes a clamp to secure said apparatus to said conduit.

5. The apparatus as claimed in claim 1 wherein said apparatus is welded to said conduit.

6. The apparatus as claimed in claim 1 wherein said apparatus further includes a locking apparatus that fixes the location of said plunger in said second position.

7. The apparatus as claimed in claim 6 wherein said locking apparatus is a locking ring.

8. The apparatus as claimed in claim 1 wherein said apparatus further includes a locking device that fixes the location of said sensor within said conduit.

9. The apparatus as claimed in claim 8 wherein said locking device is a locking ring.

10. The apparatus as claimed in claim 1 further comprising an anti-rotation device preventing said sensor from rotating within said at least a second cavity.

11. The apparatus as claimed in claim 10 wherein said anti-rotation device includes a groove and a rib disposed within said sensor and said at least a second cavity.

12. The apparatus as claimed in claim 10 wherein said anti-rotation device includes said sensor and said at least a second cavity shaped to prevent rotation.

13. The apparatus as claimed in claim 1 further comprising an anti-rotation apparatus preventing said plunger from rotating within said first cavity.

14. The apparatus as claimed in claim 13 wherein said anti-rotation apparatus includes a groove and a rib disposed within said plunger and said first cavity.

15. The apparatus as claimed in claim 13 wherein said anti-rotation apparatus includes said plunger and said first cavity shaped to prevent rotation.

16. The apparatus as claimed in claim 1 wherein said apparatus further includes at least one sampling connection.

17. The apparatus as claimed in claim 1 wherein said apparatus further includes at least one seal between said apparatus and said aperture in said conduit.

18. The apparatus as claimed in claim 1 further comprising:
   a first passageway proximate a first end of said plunger; and
   a second passageway disposed in said second cavity such that said first and said second passageway form said at least one passageway fluidly connecting said first and said second cavity when said apparatus is in said second position.

19. The apparatus as claimed in claim 1 wherein said at least one passageway is disposed within said first and second cavity such that said plunger seals said at least one passageway when said plunger is in said first position and said at least one passageway fluidly connects said first and said second cavity when said plunger is in said second position.

20. The apparatus as claimed in claim 1 wherein said second cavity is adapted to contain a second propellant.

21. The apparatus as claimed in claim 20 wherein said second propellant is activated by said first propellant.

22. The apparatus as claimed in claim 20 wherein said second propellant is a user activated propellant.

23. An apparatus for hot tapping a conduit comprising:
   a first cavity having a first end and a second end;
   at least a second cavity;
   a sensor adapted to be disposed within said at least a second cavity, said sensor and said at least a second cavity having a locking device that fixes the location of said sensor within said conduit;
   a user activatable propellant adapted to be disposed in said first end of said first cavity;
   a plunger disposed in said first cavity, said plunger having a first end, a second end having a shearing surface, and an aperture disposed between said first and said second end, said plunger and said first cavity having a locking apparatus that fixes the location of said plunger within said first cavity, whereby in a first position proximate, said plunger is disposed proximate said first end of said first cavity, and whereby when activated, said user activatable propellant forces said plunger from said first position to a second position proximate said second end of said first cavity such that said shearing surface of said plunger shears off a portion of said conduit creating an aperture in said conduit and retains said portion of said conduit proximate said second end of said first cavity, and whereby in said second position said aperture in said plunger is aligned with said second cavity and said aperture in said conduit to form a channel; and at least one passageway fluidly connecting said first and said second cavity when said plunger is disposed in said second position such that said propellant forces said sensor through said channel and into said conduit.

24. The apparatus as claimed in claim 23 wherein said plunger further includes a seal between said plunger and said first cavity.

25. The apparatus as claimed in claim 24 wherein said seal includes an o-ring seal.

26. The apparatus as claimed in claim 23 wherein said apparatus further includes a clamp to secure said apparatus to said conduit.

27. The apparatus as claimed in claim 23 wherein said apparatus is welded to said conduit.

28. The apparatus as claimed in claim 23 wherein said locking apparatus is a locking ring.

29. The apparatus as claimed in claim 23 wherein said locking device is a locking ring.

30. The apparatus as claimed in claim 23 further comprising an anti-rotation device preventing said sensor from rotating within said at least a second cavity.

31. The apparatus as claimed in claim 30 wherein said anti-rotation device includes a groove and a rib disposed within said sensor and said at least a second cavity.

32. The apparatus as claimed in claim 30 wherein said anti-rotation device includes said sensor and said at least a second cavity shaped to prevent rotation.

33. The apparatus as claimed in claim 23 further comprising an anti-rotation apparatus preventing said plunger from rotating within said first cavity.

34. The apparatus as claimed in claim 33 wherein said anti-rotation apparatus includes a groove and a rib disposed within said plunger and said first cavity.

35. The apparatus as claimed in claim 33 wherein said anti-rotation apparatus includes said plunger and said first cavity shaped to prevent rotation.

36. The apparatus as claimed in claim 23 wherein said apparatus further includes at least one sampling connection.

37. The apparatus as claimed in claim 23 wherein said apparatus further includes at least one seal between said apparatus and said aperture in said conduit.

38. The apparatus as claimed in claim 23 further comprising:
a first passageway proximate a first end of said plunger; and
a second passageway disposed in said second cavity such that said first and said second passageway form said at least one passageway fluidly connecting said first and said second cavity when said apparatus is in said second position.

39. The apparatus as claimed in claim 23 wherein said at least one passageway is disposed within said first and second cavity such that said plunger seals said at least one passageway when said plunger is in said first position and said at least one passageway fluidly connects said first and said second cavity when said plunger is in said second position.

40. The apparatus as claimed in claim 23 wherein said second cavity is adapted to contain a second propellant.

41. The apparatus as claimed in claim 40 wherein said second propellant is activated by said first propellant.

42. The apparatus as claimed in claim 40 wherein said second propellant is a user activated propellant.

43. A method of hot tapping a conduit and inserting a sensor into said conduit comprising:
securing an apparatus to said conduit, said apparatus having a first cavity, at least a second cavity adapted to contain a sensor, and a plunger disposed in said first cavity;
introducing a propellant into said first end of said first cavity;
propelling said plunger from a first position, wherein said plunger is disposed proximate said first end of said first cavity, to a second position, wherein said plunger is disposed proximate a second end of said first cavity;
shearing a portion of said conduit creating an aperture in said conduit as said plunger is propelled from said first position toward said second position;
retaining said portion of said conduit proximate said second end of said first cavity;
aligning an aperture in said plunger with said second cavity and said aperture in said conduit to form a channel when said plunger is in said second position; and creating a passageway fluidly connecting said first cavity and said second cavity when said plunger is in said second position such that said propellant flows from said first cavity into said at least a second cavity and propels said sensor through said channel and into said conduit.

44. The method as claimed in claim 43 further comprising introducing a second propellant into said second cavity.

* * * * *